April 2, 1929.   M. J. WOHLGEMUTH ET AL   1,707,293
MOTOR CONTROL SYSTEM
Filed Jan. 19, 1927
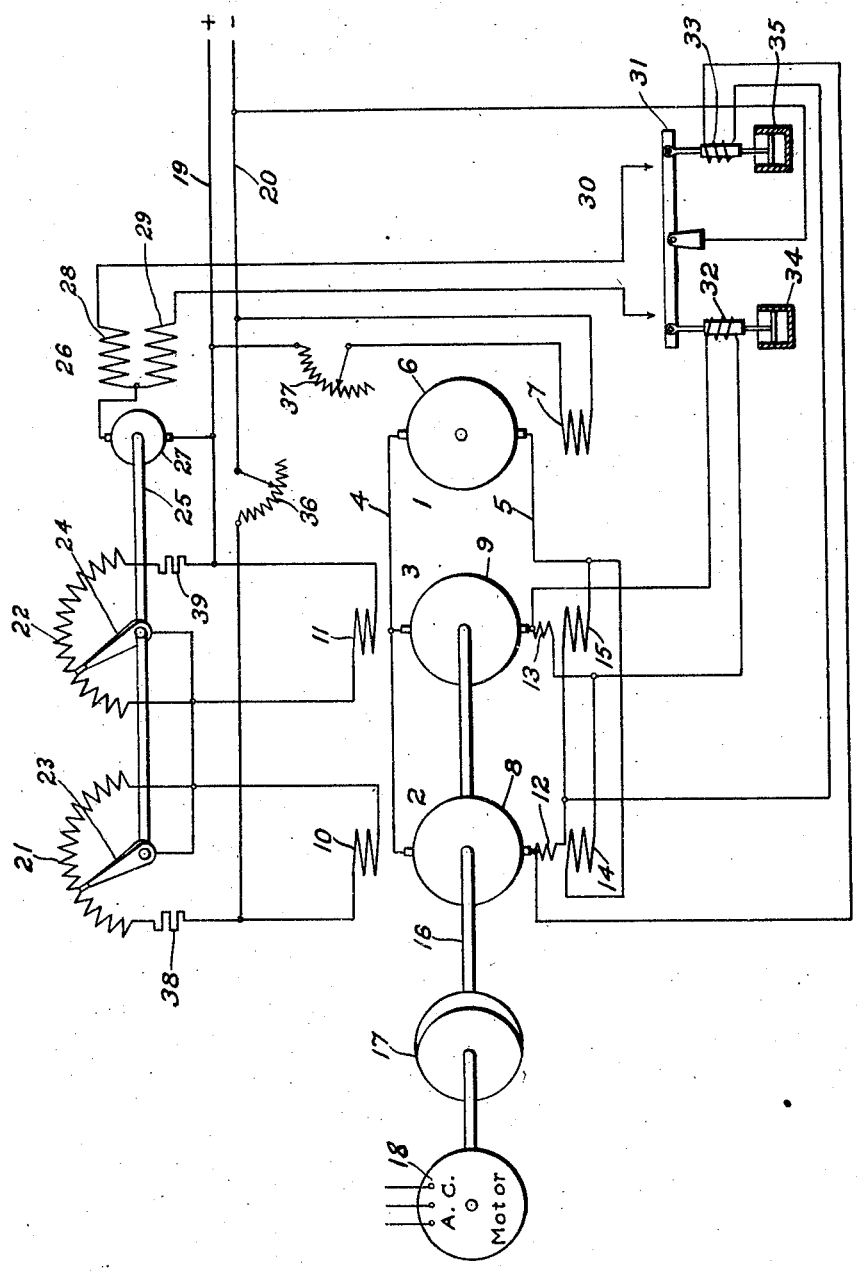
WITNESSES:
INVENTORS
Melville J. Wohlgemuth &
David Hall.
BY
ATTORNEY Patented Apr. 2, 1929.

1,707,293

UNITED STATES PATENT OFFICE.

MELVILLE J. WOHLGEMUTH, OF PITTSBURGH, PENNSYLVANIA, AND DAVID HALL, OF LOS ANGELES, CALIFORNIA, ASSIGNORS TO WESTINGHOUSE ELECTRIC & MANUFACTURING COMPANY, A CORPORATION OF PENNSYLVANIA.

MOTOR-CONTROL SYSTEM.

Application filed January 19, 1927. Serial No. 162,034.

Our invention relates to systems of control and it has particular relation to systems employed for controlling the operation of reversing mills and for similar applications.

In the operation of a heavy reversing-mill motor, it is the usual practice to control such operation by varying the voltage of the generator supplying power thereto, and a late method is to employ two generators connected in parallel relation to supply power to a single mill motor. However, some trouble has been experienced because of the generators becoming unbalanced and not dividing the load properly.

One of the objects of our invention is to provide a system for insuring proper division of load between generators that are operated in parallel relation.

Another object of our invention is to provide a system of control of the above-indicated character which shall be efficient and reliable in operation and relatively easy to manufacture and install.

In accordance with our invention, a substantially constant-voltage source of energy is utilized to supply current to field windings of each generator. Each generator has also an interpole winding and an extra field winding in series relation with its armature, this extra field winding, however, being utilized to provide a magnetic field for the other generator. A balancing means responsive to the load conditions on each generator is further provided for regulating the armature currents by means of the separately excited field windings associated with each generator.

Our invention will be more clearly understood by referring to the accompanying drawing in which the single figure is a diagrammatic view of a system embodying our invention.

Referring to the drawing, a reversing-mill motor 1 is connected to a pair of generators 2 and 3 by means of conductors 4 and 5. The motor 1 comprises an armature 6 and a separately excited field winding 7. The generators 2 and 3 comprise armatures 8 and 9, separately excited field windings 10 and 11, interpole field windings 12 and 13, and extra series-type field windings 14 and 15, respectively, the field windings 14 and 15 being so cross connected that the winding associated with the armature of one generator to produce a magnetic field therefor is connected in series relation with the armature of the other generator.

The generators 2 and 3 are mechanically coupled together by means of a shaft 16, to which is attached a balance wheel 17 for maintaining a substantially uniform speed of the generators. A driving unit, such as an alternating-current motor 18, may be attached to the shaft 16 for driving the generators 2 and 3. A source of constant direct-current is supplied by two conductors 19 and 20 to which the field winding 7 of the motor 1 is connected and to which the separately excited field windings 10 and 11, associated with the generators 2 and 3, respectively, are also connected.

Rheostats 21 and 22 are connected in parallel relation to the separately excited field windings 10 and 11, respectively. Contact arms 23 and 24 are associated with the rheostats 21 and 22 and are connected to a controlling shaft 25 for the purpose of varying the current flowing through the separately excited field windings. Any suitable responsive means may be adapted to actuate the contact arms.

In this system, we utilize a small split-phase motor 26 which has an armature 27 and direction-controlling field windings 28 and 29. The field windings 28 and 29 may be alternatively connected across the auxiliary source 19 and 20 through a balancing relay 30 which comprises a pivoted contact arm 31, opposingly-disposed actuating coils 32 and 33 and dash-pots 34 and 35. The actuating coils 32 and 33 are connected in parallel relation with the interpole field windings 12 and 13 on the generators 2 and 3, respectively.

A rheostat 36 may be placed in conductor 20 of the separately excited field-winding circuit for the purpose of manually regulating the amount of current in this circuit. A similar rheostat 37 may be utilized in series relation with the motor field winding 7 for manually regulating the excitation of the motor 1. It will be noted that permanent resistors 38 and 39 are provided in circuit with the rheostats 21 and 22, respectively, to insure against the entire resistance being excluded from these parallel circuits.

It will be noted also that, when the regulator motor 26 is actuated in either direction through the operation of the balancing relay 30, the contact arms 23 and 24 move in the same direction, but the rheostats 21 and 22 are so connected to the respective field windings 10 and 11 that, when one arm is excluding resistance, the other is adding resistance to permit an increased current flow in one field winding and a decreased current flow in the other.

The operation of the system is briefly, as follows: Assuming the generators to be idle, they may be brought to full speed by means of a motor, such as 18, and the voltage imposed upon the motor 1 by the generators 2 and 3 may be regulated by means of the manually operated rheostat 36 which controls the excitation current flowing through the separately excited field windings 10 and 11 to control the speed of that motor. The speed of motor 1 may be further controlled by manual operation of the field rheostat 37 which is in series relation with the field winding 7 of the motor 1.

When the generators 2 and 3 have attained their full speed, and normal voltage has been imposed upon the motor, resistors 36 and 37 occupy their normal running positions. If either generator attempts to carry more than its share of the load, a large current will flow through its interpole winding and the other field winding in series relation with that generator's armature. This other field winding, being magnetically associated with the other generator, will increase the magnetic field of that generator, thereby tending to raise its voltage.

At the same time the coil of the balancing relay 30 that is associated with the interpole winding carrying the most current will actuate the pivoted contact arm 31, thereby establishing a circuit through one of the field windings of the field-control motor 26, which, in turn, will actuate the rheostat contacting arms 23 and 24 in such manner that the current through the separately excited field winding associated with the generator attempting to carry the larger portion of the load will be reduced, thereby tending to reduce the voltage of that generator.

At the same time, the rheostat arm associated with the rheostat in parallel relation with the other separately excited field winding will be actuated in a manner to increase the current flowing through that field winding which will also tend to increase the voltage of that generator. This operation will continue until the second generator has its voltage sufficiently raised to carry more than its share of the load, at which time, the actuating coil of the balancing relay 30 that is associated with its interpole winding will be actuated, throwing the contact arm of the balancing relay 31 in the opposite direction, which, in turn, will energize the other field winding of the control motor 26 in such manner as to reverse the operation of the separately-excited field-winding rheostats and thereby reducing the voltage on this second generator, at the same time, again raising the voltage on the first generator, the cross-connected field windings 14 and 15 again producing a differential effect to aid this balancing of the load, in a manner similar to that described above. This action will be repeated so long as the system is in operation, the ultimate result, however, being the maintaining of a substantially uniform division of the load carried by the generators.

While we have shown our invention in a preferred form, it is apparent that modifications may be made in the arrangement of circuits and apparatus employed without departing from the spirit and scope of our invention. It will be understood that we do not limit our invention to the specific apparatus illustrated, but desire that only such limitations shall be imposed as are indicated in the appended claims.

We claim as our invention:

1. A control system comprising a plurality of direct-current generator armatures connected in parallel-circuit relation, a substantially constant-voltage source of energy, a field winding associated with each of said generator armatures and connected to said source, said field windings being connected in series, a rheostat connected in shunt relation to each of said field windings, a balancing relay responsive to a variation in the relative load currents between said generator armatures for operating said rheostats to simultaneously regulate the flow of current through said field windings.

2. A control system comprising a direct-current load, a pair of parallel-connected generators therefor severally having armatures and field windings connected in series relation therewith, the field winding connected in series relation with the armature of each generator being utilized to produce a magnetic field for the other generator, a substantially constant-voltage source of energy, a separately-excited field winding connected to said source and associated with each generator and means responsive to variations in the load ratio between said generators for differentially controlling the flow of current through said separately-excited field windings.

3. A control system comprising a distribution load, two generator armatures connected in parallel-circuit relation thereto, a substantially constant-voltage source of energy and a separately excited field winding associated with each of said generators, each generator armature having a field winding connected in series-circuit relation therewith and adapted to provide a magnetic field for the other generator armature to aid the magnetic field produced by the separately excited field windings of the respective generators and render the excitation of one generator partially dependent upon the current traversing the other generator and means responsive to variations in the load relations between said generator armatures for concurrently regulating the flow of current through said separately excited field windings for maintaining the proper load division between said generators.

4. A control system comprising a translating device, two parallel-connected generators therefor, each of said generators having an armature and a field winding connected in series relation therewith, the field winding connected in series relation with one armature being adapted to produce a magnetic field for the other generator to render the excitation of one generator dependent, for part of its excitation, upon the current traversing the other generator, a substantially constant-voltage source of energy and another field winding associated with each of said generators and connected to said source to provide additional magnetic flux for said generators and means responsive to an unbalanced load on the generators for regulating the flow of current concurrently in said separately excited field windings in a manner to properly divide the load on said generators.

5. A control system comprising a translating device, a pair of mechanically connected generators severally having armatures, separately-excited field-magnet windings, and extra field-magnet windings, a rheostat for each separately excited field winding connected in shunt relation thereto, said extra field winding of one generator being connected in series relation with said armature of the other generator to render the extra field winding of one generator dependent for excitation upon the current traversing the other generator and means responsive to variations of load relation between said generators for varying the rheostats in parallel relation with said separately excited field windings to regulate the flow of current through said windings and maintain the proper load division on said generators.

6. A control system comprising a translating device, a pair of parallel-connected generators therefor severally having armatures and separately excited field windings, interpole windings and extra field windings, rheostats connected in parallel relation with said separately excited field windings, said extra field winding associated with one generator being connected in series relation with the said interpole winding and armature of the other generator to render the excitation of the extra field winding of one generator dependent upon the current traversing the other generator, a balancing relay having actuating coils connected in parallel relation with said interpole windings and means responsive to the action of said relay for varying said rheostats to regulate the flow of current through said separately excited field windings.

7. A control system comprising a pair of generator armatures mechanically coupled together and electrically connected in parallel-circuit relation, a separately excited field winding and an extra field winding for each generator, said extra field winding of one generator being adapted to be traversed by the current flowing through the other generator and means responsive to the load relation between said generators for varying the current flowing through said separately excited field winding to maintain the proper division of load on said generators.

8. A control system comprising a pair of parallel-connected generator armatures mechanically coupled together, a source of energy, separately excited field windings for each armature connected to said source, an extra field winding associated with each generator, said extra field winding of one generator being connected in series relation with the armature of the other generator and balancing means responsive to the difference of the current traversing said armatures for simultaneously regulating the flow of current through said separately excited field windings.

9. In a control system in combination, a plurality of driven generators, a field winding for each generator, a source of power for energizing each field winding, and means for controlling the current flow in the field windings, said current control means being disposed to stand in a neutral position on a predetermined division of load between the generators and responsive to changes from the predetermined division of load to reestablish the selected load conditions.

10. In a control system in combination, a plurality of driven generators, a field winding for each generator, a source of power for energizing each field winding, and means for controlling the current flow in the field windings, said current control means being disposed to stand in a neutral position on a predetermined division of load between the generators and responsive to changes in the predetermined load division to effect an increase in the excitation of the generator underloaded and a decrease in the excitation of the generator overloaded to reestablish the predetermined load division.

11. In a control system in combination, a plurality of driven generators, a field winding for each generator, a source of power for energizing each field winding, and means for controlling the current flow in the field windings, said current control means being disposed to stand in a neutral position on a predetermined division of load between the generators and means responsive to a change in ratio of the loads carried by the generators to effect a change in the excitation of the fields to increase the load carried by one generator and decrease the load carried by another to reestablish the predetermined ratio between the loads.

12. In a control system in combination, a plurality of driven generators disposed to divide a load in a predetermined ratio, a field winding for each generator, a source of power for energizing each field winding, and means responsive to a change in the division of load on the generators for differentially changing the excitation of the field windings to maintain the predetermined division of load.

13. In a power system in combination, a plurality of direct-current generators connected in parallel circuit relation to divide the load in a predetermined ratio, said generators being provided with cross connected series field windings and separately excited shunt-field windings, and means responsive to an unbalanced load on the generators for differentially controlling the excitation of the shunt field windings, cooperative with the cross-connected series field windings to maintain the predetermined division of load.

14. In a control system in combination, a plurality of mechanically connected generators, disposed to operate at a predetermined load ratio, a field winding for each generator, a source of power for energizing the field windings, said field windings being connected in series circuit relation across the source of power, a variable rheostat connected in shunt relation to each field winding, said rheostats being disposed to operate in unison, a motor for actuating the rheostats in either direction for differentially varying the field excitation, and a relay responsive to changes in the said load ratio for effecting the operation of the rheostat actuating motor, said relay having a current coil connected in each generator circuit.

15. In a power system in combination, a pair of parallel connected dynamo-electric machines, said machines being provided with separately-excited shunt-field windings and series field windings, said series-field windings being cross-connected to render the excitation of one machine dependent upon the load of the other, and means operable to simultaneously increase and decrease the excitation of the shunt field windings, said means being responsive to the difference in load currents of the two machines to increase the effect upon the total field flux which is produced by the cross-connected series field windings, thereby to effect a quicker field regulation and restoration of load balance.

16. In a control system, in combination, a plurality of parallel-connected generators, a series-field winding and a shunt-field winding for each generator, said series-field windings being cross-connected in series with the generator armatures, a source of power for energizing the shunt-field windings, said shunt-field windings being connected in series relation to the source of power, a motor-operated rheostat for differentially controlling the excitation of the shunt field windings, and a relay disposed to control the direction of operation of the rheostat-motor, said relay being responsive to a difference in the load currents of the generators to vary the field excitation inversely to the change in load on the individual generators.

In testimony whereof, we have hereunto subscribed our names this first day of December, 1926, and this 12 day of January, 1927, respectively.

MELVILLE J. WOHLGEMUTH.
DAVID HALL.